3,623,895
METHOD OF PREPARING WATER-REPELLENT MOLDED ARTICLES FROM INORGANIC MATERIALS

Siegfried Nitzsche, Ewald Pirson, and Michael Roth, Burghausen, Upper Bavaria, Germany, assignors to Wacker-Chemie G.m.b.H., Munich, Bavaria, Germany
No Drawing. Filed Nov. 1, 1968, Ser. No. 772,815
Claims priority, application Germany, Nov. 3, 1967, P 16 71 281.5
Int. Cl. C09k 3/18
U.S. Cl. 106—2    2 Claims

ABSTRACT OF THE DISCLOSURE

Emulsions of mixtures of monomethylpolysiloxane and dimethylpolysiloxane are added to inorganic materials which cure upon addition of water to improve the water repellency of the ultimate cured product.

---

The invention relates to a method of preparing water-repellent molded articles and coatings from inorganic materials which will cure upon addition of water wherein certain organopolysiloxane emulsions are used to obtain the desired water repellency.

In methods of preparing water-repellent molded articles and coatings from inorganic materials which will cure upon addition of water, distinction must be made between methods wherein the hydrophobizing material is applied to the surface of the molded article or coating and methods in which the organosilicon compounds are added to the inorganic materials before molding. The present invention relates to processes of the latter type.

Mixing materials which will harden upon the addition of water with the organosilicon compounds before molding has the advantage that it permits the preparation of molded articles and coatings which are not only water-repellent at their surface but throughout the article, which is very effective when crevices appear, in comparison to applying hydrophobizing materials to the surface of the molded article or coating, and that it requires considerably less work. The degree of water-repellency which could be obtained with organopolysiloxanes added to inorganic materials which will harden upon the addition of water is, however, insufficient or the organopolysiloxanes used therefore are not readily obtainable and can split off hydrogen. The alkali metal organo silicicnates which also have been used as water-repellent additives have the disadvantage that they can be washed out, before their effectiveness is fully developed and that they can cause efflorescence and/or discoloration of the cured article.

The method of the present invention, on the other hand, is free from the above disadvantages. The method of the present invention makes it possible to prepare molded articles and coatings which possess a stronger water-repellency than the molded articles and coatings prepared by known methods from the inorganic materials which will cure upon the addition of water which were mixed with organopolysiloxanes before molding. The organopolysiloxanes used herein are readily obtainable. Excellent results are obtained without using siloxanes which split off hydrogen. The disadvantages which are combined with the use of alkali metal organo siliconates cannot appear in the methods of the present invention.

The present invention introduces a method of preparing water-repellent molded articles and coatings from inorganic materials which will cure upon addition of water, wherein aqueous methylpolysiloxane emulsions are added to inorganic masses before molding in order to obtain the water-repellency characterized in that a mixture of organopolysiloxanes is employed in these emulsions consisting essentially of (A) organopolysiloxanes preponderantly composed of monomethylsiloxane units and (B) organopolysiloxanes preponderantly composed of dimethylsiloxane units [$(CH_3)_2SiO$ units].

The method of the present invention is especially suitable for the preparation of molded articles and coatings from materials which will cure upon addition of water based on lime ($CaO$ or $Ca(OH)_2$), especially coatings based on lime or portland cement, i.e., highly alkaline building materials, as well as magnesia cements, alumina cements, plasters, plaster of Paris and gypsum-based cements. The inorganic materials which will cure upon addition of water can contain other common additives in addition to the additives of the present invention such as sand, vermiculite (expanded mica), perlite (expanded lava), gravel, sawdust, wood wool, bonding decelerators, gluconic acids, calcium gluconate and vinyl polymerizates.

The preparation of molded articles and coatings from inorganic materials which will harden upon the addition of water has been known for a long time. The measures taken thereby are the same for the present invention with the exception that in the method of the present invention the above defined methylpolysiloxane emulsions are also used.

The polysiloxanes (A) consisting preponderantly of monomethylsiloxane units are preferably exclusively, or insofar as commercially possible, composed of monomethylsiloxane units [$CH_3SiO_{3/2}$ units]. Other units than monomethylsiloxane units in these polysiloxanes should not amount to more than 30 mole percent and the SiC-bonded organic radicals which are present in these units should be methyl groups because of ready availability. The siloxane units which can be present in addition to the monomethylsiloxane units are usually dimethylsiloxane and/or $SiO_{4/2}$ units. The siloxanes (A) consisting preponderantly of monomethylsiloxane units expediently possess a viscosity not exceeding 1000 cs./25° C. (measured in 50 percent by weight toluene solution).

The polysiloxanes (B) consisting preponderantly of dimethylsiloxane units are preferably exclusively, or insofar as commercially feasible, composed of dimethylsiloxane units. Other units besides dimethylsiloxane units in these polysiloxanes preferably do not exceed 10 mole percent and the SiC-bonded organic radicals which are present in these units are preferably methyl groups because of the ready availability. The siloxane units other than dimethylsiloxane can be $SiO_{4/2}$, $CH_3SiO_{3/2}$ and $$(CH_3)_3SiO_{1/2}$$

units. The siloxanes consisting preponderantly of dimethylsiloxane units expediently possess a viscosity not exceeding 100,000 cs./25° C.

The organopolysiloxanes used according to the present invention are incorporated in the form of aqueous emulsions, hence 1 to 20 percent of siloxane oxygen atoms in these organopolysiloxanes can be replaced by hydroxyl groups and/or alkoxy groups which are mostly ethoxy groups.

Methyl groups, siloxane oxygen atoms as well as hydroxyl groups and/or alkoxy groups, are preferably the only substituents on the silicon atoms in the organopolysiloxanes used in the present invention.

The weight ratio of polysiloxanes (A) consisting preponderantly of monomethylsiloxane units to the polysiloxanes (B) consisting preponderantly of dimethylsiloxane units is preferably 99 to 1 to 30 to 70, especially 90 to 10 to 70 to 30.

The preparation of aqueous emulsions of organopolysiloxanes is widely known and the preparation of emulsions used according to the present invention can take place according to these known methods. Especially good results are obtained when polyvinyl alcohol is used as the dispersing agent. The dispersing agent is preferably used in quantities of 0.1 to 5 percent by weight calculated on the weight of the organopolysiloxanes.

In the preparation of methyl polysiloxane emulsions used for the method of the present invention, the organopolysiloxanes are expediently emulsified in the form of solutions in normally fluid organic solvents in the water. Examples of suitable organic solvents are aliphatic hydrocarbons such as the alkanes with boiling points in the range of 120° to 180° C. at atmospheric pressure, aromatic hydrocarbons such as toluene, xylene and trimethylbenzene; chlorohydrocarbons such as trichloroethylene; alcohols such as isopropyl alcohol and diacetone alcohol; esters such as ethyl acetate; ethers such as di-n-butyl-ether and ketones such as methylethyl ketone. The organic solvents are preferably used in quantities of 25 to 75 percent by weight calculated on the weight of the organopolysiloxane.

The polysiloxanes consisting preponderantly of monomethylsiloxane units and the polysiloxanes consisting preponderantly of dimethylsiloxane units can be emulsified in the water together or separately. However, emulsions can also be used which were prepared by mixing an aqueous emulsion of the polysiloxanes consisting preponderantly of monomethylsiloxane units with an aqueous emulsion of the polysiloxanes consisting preponderantly of dimethylsiloxane units. If desired, aqueous emulsions of polysiloxanes consisting preponderantly of monomethylsiloxane units and aqueous emulsions of polysiloxanes consisting preponderantly of dimethylsiloxane units can also be mixed in any desired succession with the inorganic materials.

The organopolysiloxane emulsions used according to the method of the present invention preferably contain 20 to 30 percent by weight of organopolysiloxane calculated on the weight of the emulsions. The preferred percentage water content of the emulsions is obtained from the difference of the 20 to 40 percent by weight organopolysiloxane taking into consideration the above percentages for dispersing and solvent materials to 100.

The emulsions are preferably used in such quantities that 0.001 to 10 percent by weight, especially 0.02 to 2 percent by weight of organopolysiloxanes, are present, always calculated on the dry weight of the inorganic materials which will cure upon addition of water.

Preparation of the emulsions used in the following examples:

(I)

(a) 300 ml. of ethanol is first added to 800 g. of methyltrichlorosilanes in 100 ml. toluene while stirring and then 100 ml. of water are added dropwise. The oily phase which separates out after allowing the mixture thus obtained to stand is freed of hydrochloric acid first with diluted aqueous ammonia and then with water. Finally, a 50 percent solution of monomethylpolysiloxane in toluene is prepared from this fluid by evaporating off volatile components.

(b) 50 parts by weight of the solution thus obtained having a viscosity of approximately 50 cs./25° C. are emulsified in a homogenizing apparatus in 40 parts by weight of water which has been mixed with 10 parts by weight of a 10 percent by weight aqueous solution of polyvinyl alcohol with residual acetyl groups [saponification count (i.e., mg. KOH, necessary for splitting off and utilizing the residual acetyl groups in 1 g. of polyvinyl alcohol) 140], viscosity measured from a 4 percent by weight aqueous solution at 20° C.:25 cp. (Preparation 1.)

(II)

(a) 50 parts by weight of a dimethylpolysiloxane containing 1 ethoxy group in each terminal unit having a viscosity of 600 cs./25° C. is dissolved in 50 parts by weight of toluene.

(b) 50 parts by weight of the solution thus obtained is emulsiled in 40 parts by weight of water which has been mixed with 10 parts by weight of a 10 percent by weight aqueous solution of polyvinyl alcohol of the above type by means of a homogenizing apparatus. (Preparation 2.)

(III)

(a) Solutions prepared as under (I)(a) or (II)(a) are mixed in the organopolysiloxane-mixture ratios given in the following tables.

(b) 50 parts by weight of the solution thus obtained is emulsified in 40 parts by weight of water which has been mixed with 10 parts by weight of a 10 percent by weight aqueous solution of polyvinyl alcohol of the type described above by means of a homogenizing apparatus. (Preparation 3.)

(IV)

Emulsions prepared as under (I)(b) or (II)(b) are mixed in the organopolysiloxane-mixture ratios given in the following tables.

EXAMPLE 1

Two parts by weight of the emulsions prepared as described above under (I) to (IV) were mixed into each of a lime-paint samples consisting of a mixture of 25 parts by weight $Ca(OH)_2$ (the inorganic materials curing upon addition of water) and 75 parts by weight of water, per 100 parts of lime-paint. The samples of lime-paint are then applied to 2 months old stucco consisting of lime cement mortar by painting on twice. Fourteen days after applying the paints 0.5 ml. of water are applied to the surfaces with a pipette to test the degree of water repellency and the time is measured which elapses until the water droplets are absorbed by the coating or are evaporated or disappeared. The average values of these times are given in the following Table 1.

TABLE 1

| Organopolysiloxane portion of the emulsion | Preparation | Time and seconds until 0.5 ml. of water disappear |
|---|---|---|
| Monomethylpolysiloxane | I | 15 |
| Dimethylpolysiloxane | II | 42 |
| 1 part by weight monomethylpolysiloxane, 2 parts by weight dimethylpolysiloxane. | III | 220 |
| 1 part by weight monomethylpolysiloxane, 1 part by weight dimethylpolysiloxane. | III | 1,920 |
| 2 parts by weight monomethylpolysiloxane, 1 part by weight dimethylpolysiloxane. | III | 5,700 |
| 1 part by weight monomethylpolysiloxane, 2 parts by weight dimethylpolysiloxane. | IV | 300 |
| 1 part by weight monomethylpolysiloxane, 1 part by weight dimethylpolysiloxane. | IV | 100 |
| 1 part by weight monomethylpolysiloxane, 2 parts by weight dimethylpolysiloxane. | IV | 80 |

EXAMPLE 2

The procedure described in Example 1 is repeated with the alteration that the samples of lime-paint are mixed with 4 parts by weight of emulsions described under (I) to (III) per 100 parts by weight of lime-paint instead of the 2 parts by weight of the emulsions. The water-repellency is tested as described in Example 1. The results of these tests are given in Table 2.

TABLE 2

| Organopolysiloxane portion of the emulsion | Preparation | Time and minutes until 0.5 ml. of water disappear |
|---|---|---|
| Monomethylpolysiloxane | I | 14 |
| Dimethylpolysiloxane | II | 85 |
| 1 part by weight monomethylpolysiloxane, 2 parts by weight dimethylpolysiloxane. | III | 155 |
| 1 part by weight monomethylpolysiloxane, 1 part by weight dimethylpolysiloxane. | III | 398 |
| 2 parts by weight monomethylpolysiloxane, 1 part by weight dimethylpolysiloxane. | III | 428 |

EXAMPLE 3

Two parts by weight of a monomethylpolysiloxane solution prepared as described above under (I)(a) are mixed with 1 part by weight of a dimethylpolysiloxane solution described as under (II)(a). From this mixture an aqueous emulsion is prepared as described under (III)(b) which contains 25 percent by weight calculated on the total weight of the emulsion of organopolysiloxanes. The emulsion thus obtained is mixed into samples of lime-paint consisting of a mixture of 25 parts by weight $Ca(OH)_2$ and 75 parts by weight of water in the various quantities given in the following table. The samples of lime-paint are then applied twice on 14 day old lime cement stucco. The water-repellency was tested as described in Example 1. The results of these tests are given in Table 3.

TABLE 3

| Parts by wt. emul. per 100 parts by wt. of lime-paint: | Time and min. until 0.5 ml. of water disappear |
|---|---|
| 1 | 2 |
| 2 | 51 |
| 3 | 265 |
| 4 | 307 |
| 5 | 466 |
| 6 | Above 503 |

That which is claimed is:

1. A method of preparing water-repellent molded articles and coatings from inorganic materials which will cure upon the addition of water comprising mixing aqueous methylpolysiloxane emulsions with the inorganic materials prior to cure, said methylpolysiloxane employed in these emulsions being a mixture of (A) polysiloxanes consisting essentially of monomethylsiloxane units having a viscosity not exceeding 1,000 cs. at 25° C. when tested at 50 weight percent solids in toluene and (B) polysiloxanes consisting essentially of dimethylsiloxane units having a viscosity not exceeding 100,000 cs. at 25° C. when tested neat; the weight ratio of monomethylsiloxane units (A) to dimethylsiloxane units (B) in said mixture being in the range from 99/1 to 30/70; said inorganic material being present in a ratio of 90/10 to 99.999/0.001 based on the dry weight of the inorganic material and the polysiloxanes, said inorganic material being selected from the group consisting of lime, portland cement, magnesia cements, alumina cements, plaster of Paris and gypsum based cements.

2. The method of claim 1 wherein the ratio of polysiloxane (A) to polysiloxane (B) is in the range from 90:10 to 70:30.

References Cited

UNITED STATES PATENTS

| 3,086,953 | 4/1963 | Nitzche et al. | 106—119 X |
| 3,190,762 | 6/1965 | Carlson et al. | 106—90 |
| 3,318,839 | 5/1967 | Weissbach | 106—119 X |
| 3,455,710 | 7/1969 | Nitzche et al. | 106—111 |

LORENZO B. HAYES, Primary Examiner

U.S. Cl. X.R.

106—90, 104, 107, 111, 119; 260—29.2 M, 37 S B